Patented May 19, 1925.

1,538,860

UNITED STATES PATENT OFFICE.

WILLIAM G. LINDSAY, OF NEWARK, NEW JERSEY, ASSIGNOR TO THE CELLULOID COMPANY, A CORPORATION OF NEW JERSEY.

COMPOSITION.

No Drawing. Application filed March 29, 1923. Serial No. 628,435.

*To all whom it may concern:*

Be it known that I, WILLIAM G. LINDSAY, a citizen of the United States, residing at Newark, in the county of Essex and State of New Jersey, have invented certain new and useful Improvements in Compositions, of which the following is a specification.

This invention relates to fireproof or non-inflammable composition. It also relates to a process for rendering certain inflammable materials, substances, or compounds, non-inflammable, and to the preparation of commercially useful non-inflammable articles, such as paper, textile fabrics, cellulose plastics, pyroxylin plastics and the like.

The degree of non-inflammability sought for is that which will not permit of a self sustaining combustion, after the application of a flame at ordinary or normal temperature. This degree of non-inflammability will however, be varied according to desired conditions.

I have discovered that inflammable materials which permit of a self sustaining combustion by the application of a flame at ordinary or normal temperature may be prevented from burning under ordinary conditions and rendered non-inflammable provided there is present in suitable combination a heat absorbing compound capable of absorbing or taking up through decomposition, volatilization, or other change, or means the heat that would be necessary to raise and maintain the material or its components to and at the point to and at which ignition could be sustained.

This endothermic or heat absorbing substance or compound should be of such nature that it will decompose, or otherwise be in condition to absorb heat, before or when the temperature of combustion of the material to be rendered non-inflammable has been reached. The absorption of heat will thus proceed at such rate as to prevent the combustible material from attaining its temperature of ignition. The endothermic substance or compound will also be selected having in view other characteristics besides its heat absorbing capacity on decomposition, in that it may be desired to impart other properties to the resultant product. The relative proportions of the combustible substance, i. e., the substance to be rendered non-inflammable, and endothermic or heat absorbing substance, will be varied somewhat to meet conditions of strength, plasticity, transparency or other desirable characteristics, but in general will be dependent upon the amount of decomposition, in heat unit equivalents, that may take place at or below the temperature at which combustion could be sustained by the exothermic compound if the heat of combustion were not absorbed at a greater rate than that at which it could be liberated. The general rule is that a sufficient quantity of endothermic substance should be employed to absorb upon its decomposition a sufficient amount of heat to prevent a sustained combustion of the said exothermic substance.

In carrying out my invention, any one of a number of products may be the aim. The characteristics of these products may vary from that of a hard, non-moldable, dense solid sheet material which may be used for cutting out various objects such as brush backs, mirror backs, knife handles, etc. to that of a thin, highly flexible product which may be used for veneering of fabrics, paper and the like or which can be used in place of various textiles and other flexible materials. The flexible compound may also be used as a substitute for leather. It may also possess the necessary characteristics required in compounds that are to be molded such as molded boxes, molded handles, molded brushes, mirrors, etc.

In carrying out the invention the procedure will vary according to the nature and physical properties of the material treated. In cases where plastic or similar compositions are the object the exothermic substance which I propose to use will be nitrocellulose, acetylcellulose or some cellulosic ester, ether, such as soluble ethyl or methyl cellulose or similar derivative or compound.

The permanent or nonvolatile solvents, generally referred to as the plasticizing agents and which are to be combined with the pyroxylin or other cellulose derivative for the purpose of bringing about the necessary conversion, etc. in the course of manufacture, should be of such nature that the point of ignition is relatively high. In my experiments I have found that the organic phosphates possess the necessary characteristics of solubility and at the same time possess the requisite temperature of ignition. Other plasticizing agents may be used providing of course, that the temperature of ignition is sufficiently high, or that a sufficient proportion of heat absorbing compound is used in order to absorb the heat liberated by a more combustible plasticizing agent and that the necessary solubility and strength of plasticizing effect are present. As aromatic phosphates I prefer liquid tricresylphosphate although I may use triphenylphosphate, tribenzylphosphate or phosphates of the higher phenols. The most satisfactory results are produced with the aromatic phosphates because of their relatively high stability and resistance to decomposition, and because they possess at the same time the necessary solvent or plasticizing effect on the nitrocellulose, as well as a relatively high ignition point.

To a mixture of nitrocellulose and an aromatic phosphate, as for example, liquid tricresylphosphate, I add a sufficient amount of magnesium di-hydrogen ortho-antimonate to prevent the combined mixture from sustaining ignition upon the application and withdrawal of a flame. This latter compound may be prepared, by precipitation, by adding a solution of a magnesium salt to a solution of dipotassium di-hydrogen pyro-antimonate. This product may be used in either the amorphous or crystalline form.

Antimonates of other metals may be employed in lieu of or in addition to the magnesium antimonate above described. Examples of such other compounds are the antimonates of aluminum, calcium or zinc. In general these antimonates may be prepared in a similar manner to the magnesium antimonate, namely, by the addition to the solution of a salt of the metal a solution of dipotassium di-hydrogen pyro-antimonate. The exact character of these precipitates or derivatives of acid potassium pyro-antimonate, will depend somewhat on the temperature and concentration of the reagents employed.

An example of proportions to be employed is 100 parts of pyroxylin, 40 to 90 parts of liquid tricresylphosphate, and 40 to 150 or more parts of magnesium di-hydrogen ortho-antimonate. The material obtained by the mixture of pyroxylin, tricresylphosphate and magnesium di-hydrogen ortho-antimonate when manipulated according to the usual methods as obtained in the pyroxylin plastic industry, will possess hardness, toughness and moldability in similar degree to the usual varieties of pyroxylin plastic materials, manufactured in the form of ivory, opaque colors and the like.

As an example of proportions where such soluble derivatives or forms of cellulose are to be used, as acetyl cellulose, ethyl cellulose, methyl cellulose or the like or mixed esters such as ester ether derivatives, I add from 10 to 30 parts or more of the desired plasticizing agent such as tricresylphosphate or the like to 100 parts of the soluble cellulose derivative, using a suitable solvent to produce the desired consistency and conversion as might be selected by one skilled in the art and add from 30 to 70 parts or more of the heat absorbing constituent, as for instance, magnesium di-hydrogen ortho-antimonate.

In the manufacture of these non-inflammable compounds I proceed substantially as in the manufacture of ordinary pyroxylin plastic materials, incorporating the magnesium di-hydrogen ortho-antimonate compound with the soaked or colloidized mass of pyroxylin and liquid tricresylphosphate prior to final mastication on the rolls. This incorporation may be effected in kneaders or the magnesium antimonate compound may be directly added during the course of mastication on the rolls. The magnesium antimonate may also be incorporated with the pyroxylin in the same operation in which the liquid tricresylphosphate is incorporated, the method for which is described in my U. S. Patent No. 1,233,374, granted July 17, 1917.

In the choice of liquid volatile solvent, I may select any one or a combination of a number of the common ordinary solvents, such as methyl alcohol, ethyl alcohol, acetic ether, acetone, amyl acetate, or the various commercial grades and mixtures of these compounds as are ordinarily found upon the market.

In the manufacture of the flexible non-inflammable compound having the properties of leather and the like, I proceed as in the example specified but instead of employing 50 to 75 parts of liquid tricresylphosphate, I increase the amount from 140 to 200 parts to 100 parts pyroxylin. Material of this composition may be worked up according to the usual method for the manufacture of pyroxylin plastic compounds, and produced in the form of sheets by shaving from a block, or it may be dissolved in a suitable proportion of solvent such as wood alcohol, acetone and the like and spread upon a suitable surface such as a textile fabric, leather and the like.

While I have disclosed the use of magnesium di-hydrogen ortho-antimonate and similar compounds, as heat absorbers for cellulose ester compositions it is obvious that its use is not limited thereto as the same may be used in a similar relation to a variety of other substances or bodies.

I claim:

1. A composition comprising a cellulose derivative, a plasticizing agent therefor comprising an aromatic phosphate and a fire-retarding agent comprising magnesium di-hydrogen ortho-antimonate.

2. A non-inflammable composition comprising a cellulose derivative, a plasticizer therefor comprising an aromatic phosphate and a fire retarding ingredient consisting of magnesium di-hydrogen ortho-antimonate containing water of crystallization.

3. A composition containing a cellulose ester, a plasticizer therefor comprising an aromatic phosphate and in close association therefor with magnesium di-hydrogen ortho-antimonate.

4. A composition containing a cellulose ester, a plasticizer therefor and in close association therewith amorphous magnesium di-hydrogen ortho-antimonate.

5. A composition containing a cellulose ester, a plasticizer therefor comprising tricresylphosphate and a fire retarding ingredient consisting of magnesium di-hydrogen ortho-antimonate.

6. A composition containing a plasticized pyroxylin and magnesium di-hydrogen ortho-antimonate in sufficient quantity to act as a fire-retarding ingredient.

7. A composition containing pyroxylin, a plasticizer therefor comprising tricresylphosphate and magnesium di-hydrogen ortho-antimonate.

8. A composition containing pyroxylin, a plasticizing agent therefor comprising tricresylphosphate and amorphous magnesium di-hydrogen ortho-antimonate in sufficient quantity to act effectively as a fire retarding agent.

9. A process which consists in mixing liquid tricresylphosphate and magnesium di-hydrogen ortho-antimonate with pyroxylin and manipulating the mixture in the presence of a volatile solvent.

10. A composition comprising a plasticized cellulose derivative and a fire retarding ingredient comprising a metallic antimonate.

11. A composition comprising a plasticized cellulose derivative and a derivative of acid potassium pyro-antimonate said derivative being a salt of an antimony acid.

12. A composition having the usual properties of a pyroxylin plastic, comprising a cellulose derivative and sufficient magnesium di-hydrogen ortho-antimonate to have a fire retarding effect.

WILLIAM G. LINDSAY.